United States Patent
Luft et al.

(10) Patent No.: US 11,811,243 B2
(45) Date of Patent: Nov. 7, 2023

(54) MODULAR, MOBILE POWER SYSTEM FOR EQUIPMENT OPERATIONS, AND METHODS FOR OPERATING SAME

(71) Applicant: Alloy Energy Solutions Inc., Calgary (CA)

(72) Inventors: Don Luft, Calgary (CA); Thomas Vis, Red Deer (CA); Jason Cockerill, Calgary (CA)

(73) Assignee: ALLOY ENERGY SOLUTIONS INC., Calgary (CA)

( * ) Notice: Subject to any disclaimer, the term of this patent is extended or adjusted under 35 U.S.C. 154(b) by 0 days.

(21) Appl. No.: 16/399,474

(22) Filed: Apr. 30, 2019

(65) Prior Publication Data
US 2020/0350790 A1    Nov. 5, 2020

(51) Int. Cl.
  *H02J 50/80*    (2016.01)
  *F04B 49/06*    (2006.01)
  *F04B 49/08*    (2006.01)

(52) U.S. Cl.
  CPC ............ *H02J 50/80* (2016.02); *F04B 49/065* (2013.01); *F04B 49/08* (2013.01)

(58) Field of Classification Search
  CPC . H02J 50/80; H02J 5/005; H02J 7/025; E21B 41/0085
  See application file for complete search history.

(56) References Cited

U.S. PATENT DOCUMENTS

| | | | |
|---|---|---|---|
| 4,088,940 A | 5/1978 | Ciarniello et al. | |
| 5,135,359 A | 8/1992 | Dufresne | |
| 5,621,248 A | 4/1997 | De Villiers | |
| 5,742,147 A | 4/1998 | Molina et al. | |
| 7,186,473 B2 * | 3/2007 | Shiue | H01M 6/50 320/103 |
| 8,446,040 B2 | 5/2013 | Paik et al. | |
| 8,866,334 B2 * | 10/2014 | Donnelly | H02J 3/383 290/43 |
| 8,879,242 B2 * | 11/2014 | Prax | H02S 20/10 52/173.3 |
| 9,065,272 B2 * | 6/2015 | Simi | H05B 47/24 |
| 9,579,980 B2 * | 2/2017 | Cryer | F04B 47/02 |
| 2009/0195074 A1 | 8/2009 | Buiel | |
| 2009/0312885 A1 * | 12/2009 | Buiel | H02J 3/38 700/297 |
| 2013/0309099 A1 | 11/2013 | Irving et al. | |
| 2020/0108364 A1 * | 4/2020 | Glass | B01F 15/00558 |

OTHER PUBLICATIONS

Backup Power Systems—Power Online Battery Backup—Sun Wize; retrieved from the internet at https://www.sunwize.com/application-item/backup-power-systems/; available online at least as early as Apr. 12, 2019, 3 pages.

* cited by examiner

*Primary Examiner* — Ryan Johnson
*Assistant Examiner* — Colleen J O Toole

(57) ABSTRACT

A system to power pressure pumps and auxiliary equipment for oil and gas operations. The system includes a mobile system controller and energy storage unit electrically connected to pressure pumping and auxiliary loads. The system can also include a power generation source. One application of the technology is to pump fluids to an oil and gas end user which can be an oil or gas well, pipeline or plant. The system can be modularized and can be fully mobile and transportable by a variety of means.

16 Claims, 11 Drawing Sheets

MODULAR, MOBILE POWER SYSTEM FOR EQUIPMENT OPERATIONS, AND METHODS FOR OPERATING SAME

TECHNICAL FIELD

The following relates to equipment used in industrial applications, such as pressure pumping in oil and gas operations. In particular, the following relates to a system and method to efficiently transmit power to primary and optionally auxiliary equipment.

BACKGROUND

Pumping and other equipment have long been used in a variety of industrial applications such as on oil and gas wells, including hydraulic fracturing, cementing and acidizing and other similar oilfield operations including cryogenic fluid pumping. Auxiliary equipment used in combination with pressure pumping operations can include but is not limited to, the use of compressors, electric motors, fluid blending systems, air-conditioning and heating systems, control systems, data capture systems and lighting systems.

The pumping equipment used in oilfield operations is generally comprised of a pump coupled to a transmission that is driven by an engine. The pump serves to increase the pressure of a given fluid that is then pumped to and into the well or other end "user" (such as a pipeline or plant piping). To provide energy to the pump, an engine, often diesel fueled, is operated to produce mechanical energy through rotation of a drive shaft and is coupled to the pump through a gear box and transmission. Such pump, transmission and engines are often configured as a single mobile unit mounted on a truck or tractor-trailer configuration. In certain operations, several pump, transmission and engine units are placed in parallel to provide a desired pumped fluid flow rate and pressure to the end user. Additional energy is also typically required for well site operations via additional engines to operate other auxiliary equipment. Due to practical operating constraints, these systems may be unable to operate at the stated full rated capabilities due to factors such as, but not limited to, control system constraints, system losses in transmission as well as engine speed and gearing limitations to operate the pumps. This can require oversizing of equipment to reach targeted operational requirements. Furthermore, these operations are known to often produce significant noise and environmental pollution through the burning of fossil fuels as well as can lead to safety concerns due to congested site operations and continued fueling of diesel engines during operations.

More recently in some hydraulic fracturing operations (a specific subset of pressure pumping operations), in place of diesel engines, gas turbine engines have been introduced to create electricity via a generator, which then provides electric power to a motor that then transmits energy to a pump through a variable frequency drive. Such systems overcome some of the challenges of traditionally used pumping systems. In particular, these systems are found to pollute less and can be more energy efficient. These systems also generally include only one or a small number of generators where a failure of the generator may have adverse implications on the operations due to lack of power availability and potentially damage the oil or gas well.

In each of the diesel and gas turbine powered configurations, the equipment used is designed for peak power operations as well as to take into account the various system losses. This can result in oversizing of equipment and high capital and operating costs. For example, during fracturing operations, the pressure (and corresponding power) requirements to fracture a reservoir only peak for short periods of time, while a large portion of time associated power requirements are normally less. Such "peak" power requirements can be optimally served through the use of a system controller and energy storage units.

Pressure pumping operations are typically controlled by simple feedback loops of direct operational data, including pressures and flow rates. Operations are often monitored and controlled in a manual fashion, for example, where an operator monitors and controls the diesel engine speed and transmission/gear selection to produce the desired pump output. Such systems can be costly to operate (higher maintenance costs) and can be subject to inefficient energy use through transmission losses and inefficient pump output.

It is an object of the following to address at least one of the above-noted challenges.

SUMMARY

In one aspect, there is provided a power management system comprising: one or more power generation sources; one or more mobile energy storage units each configured to receive power from a power generation source, store energy and transmit power back to at least one or more equipment loads; one or more mobile equipment loads each configured to receive power from the mobile energy storage units and use the power received to perform an operation; and a mobile system controller configured to exchange data signals to/from the power generation sources, the mobile energy storage units, and the mobile equipment loads to operate and control the system.

In an implementation, the one or more power generation sources comprise one or more of reciprocating engines, rotating turbine generators, utility power, solar, wind or a combination thereof. In an implementation, the equipment comprises pressure pumping equipment.

In an implementation, the mobile system controller is configured to control the flow of power to and from the mobile energy storage units and to the mobile equipment loads. In an implementation, the mobile system controller is further configured to control the flow of power to and from an auxiliary load. The system can also include a mobile power transformer interposed between the mobile energy storage unit and the auxiliary load.

In an implementation, the operation comprises transmitting fluid to an end user via a pipe, manifold and/or other connection.

In an implementation, the components of the system are modular and can be added, removed and/or rearranged to increase or decrease the size of the system.

In an implementation, the mobile energy storage units, the mobile system controller, and the mobile equipment loads are mounted on a container, skid, trailer or other mobile structure to enable transportation via a mode of transportation. In an implementation, the system is configured to enable power to be provided to the mobile equipment loads without using the one or more power generation sources.

In other implementations: the system is configured to enable power to be provided to the mobile equipment loads using only the one or more mobile energy storage units, and/or the one or more mobile energy storage units are used as the only source of power for an amount of time depending on a user requirement and/or storage unit size, and/or the mobile energy storage unit contains at least one battery and associated temperature control, safety and alarm system and wireless data transmission components to provide power to the mobile system controller, and/or the mobile system controller is comprised of multiple electrical control system functions combined to operate, record data, synchronize, coordinate, protect and control the entire electrical system and associated mobile equipment loads.

In another implementation, the mobile system controller is configured to apply predictive analytics and algorithms to optimally distribute power throughout the system and for determining optimal power transfer to the pressure pumping and auxiliary loads.

In another implementation, the mobile system controller is configured to provide peak shaving/load leveling to short term changes in equipment loads and one or more auxiliary loads, to optimize operational performance at each end user in a mobile and modular configuration.

In another implementation, the mobile system controller is configured to combine multiple work load systems together in a modular and expandable fashion.

In another implementation, the mobile system controller is configured to combine different numbers and types of power generation sources, energy storage units and loads for a given work load system.

BRIEF DESCRIPTION OF THE DRAWINGS

Embodiments will now be described with reference to the appended drawings wherein.

DETAILED DESCRIPTION

Figure 1:
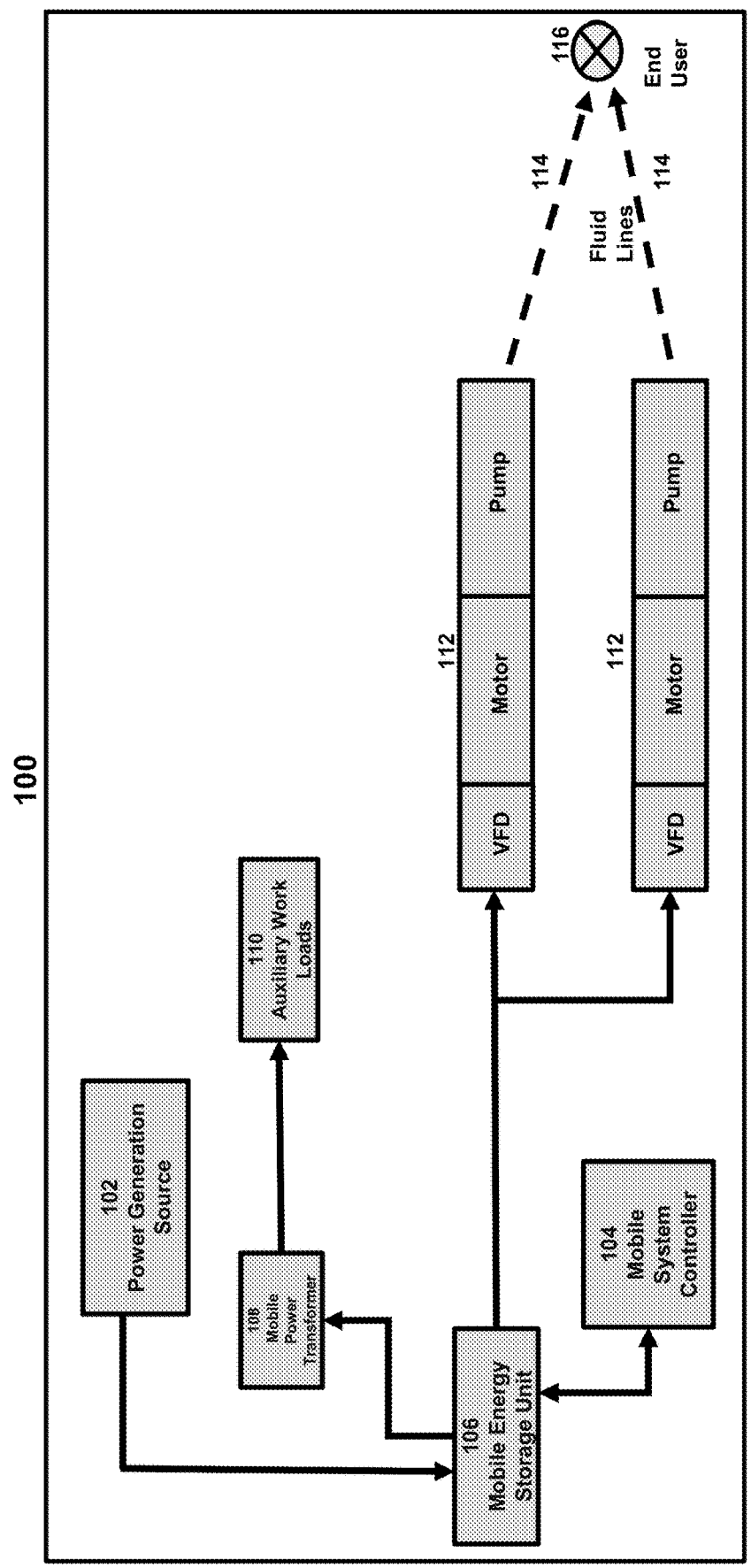
FIG. 1 is a schematic diagram of a primary modular mobile work load system.

Disclosed herein is a system for transmitting electrical power to equipment typically used in industrial applications, e.g., in the oil and gas industry. The following examples are provided in the context of pressure pumping (and associated auxiliary) equipment for use in oil and gas operations. However, it will be appreciated that the principles discussed herein equally apply to other types of motor-driven equipment in other applications utilizing such equipment. For example, the system can be used to electrically power drive systems for positive displacement pumps including reciprocating pumps and rotary pumps, dynamic pumps including centrifugal pumps used in the pumping of Newtonian, non-Newtonian and cryogenic liquids. The system could also be used to electrically power drive systems for positive displacement compressors including reciprocating and rotary compressors, dynamic compressors including centrifugal compressors, hoisting devices, winches, augers, conveyor systems, electrical motors for all drive system applications. Moreover, the system can be used to electrically power control systems, automation control systems, monitoring systems, analytic data systems, lighting systems, without limitation. Example industries include, without limitation, the oil and gas/energy industry, and the water production industry.

The example system described herein can include one or more electrical connections from a fixed or mobile power source to a mobile energy storage unit, which is in turn connected to the equipment, herein exemplified by mobile pressure pumping and mobile auxiliary loads and mobile system controller.

In one implementation, the fixed or mobile power source can be provided by one or more reciprocating engines, rotating turbine engines, one or more power grid or utility power connections, one or more solar power generators, one or more wind power generators or any other number of power generators/sources. Several different types of power sources can be used at the same time in parallel. For example, power can be sourced from both a grid connection and a solar power generator at the same time.

In another implementation, the mobile energy storage unit can be provided by one or more chemical batteries, or by one or more chemical batteries with one or more electric capacitors. The mobile energy storage unit can receive an electric current from different power generation sources and transmit power to various mobile pressure pumping and mobile auxiliary loads. An energy storage management system can be used to control the rate of charge/discharge of the overall energy storage unit and is implemented to provide protection to the energy storage unit.

In another implementation, the mobile system controller provides overall system control. The mobile system controller can transmit (send and receive) various data signals to/from the power generation sources, the mobile energy storage units and mobile pressure pumping and auxiliary load equipment to operate and control the overall system. A variety of electronic subsystems can be used by the mobile system controller to operate the overall system. The mobile power source may or may not be present during oil and gas operations and the system can operate with only the mobile system controller and mobile energy storage unit to provide power to the mobile pressure pumping and auxiliary operating loads.

Figure 2:
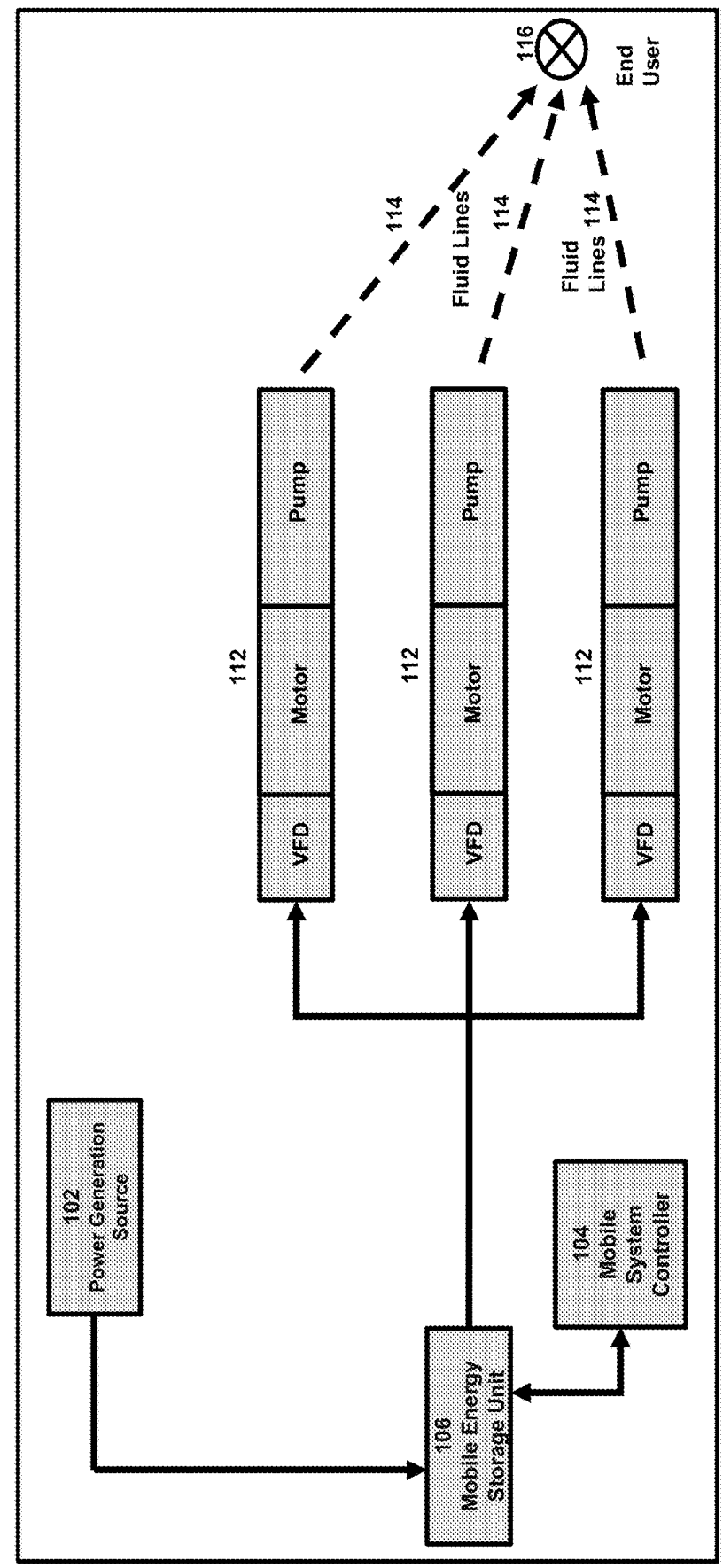
FIG. 2 is a schematic diagram of a secondary modular mobile work load system.
Figure 3:
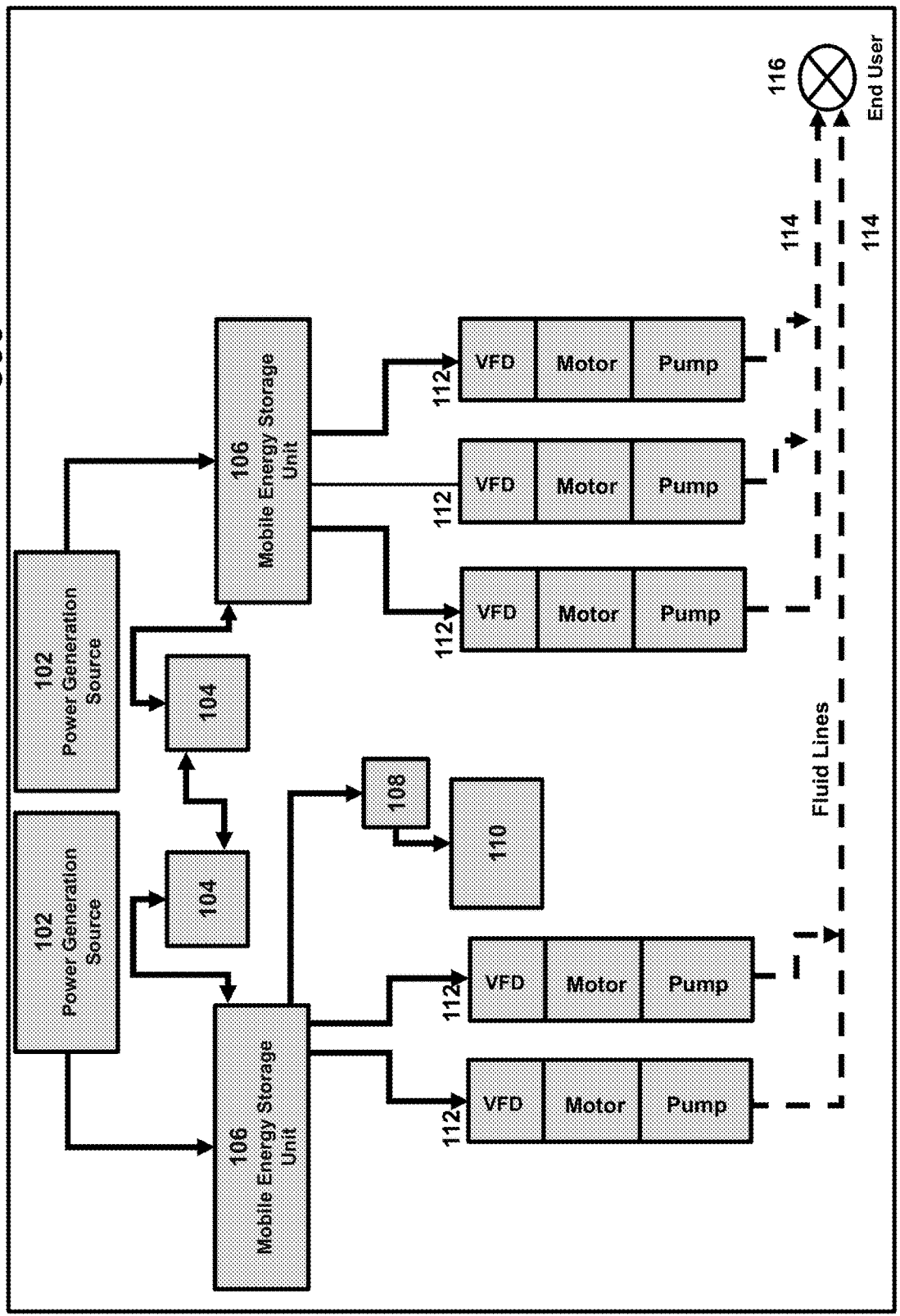
FIG. 3 is a schematic diagram of a combined modular mobile work load system.
Figure 4:
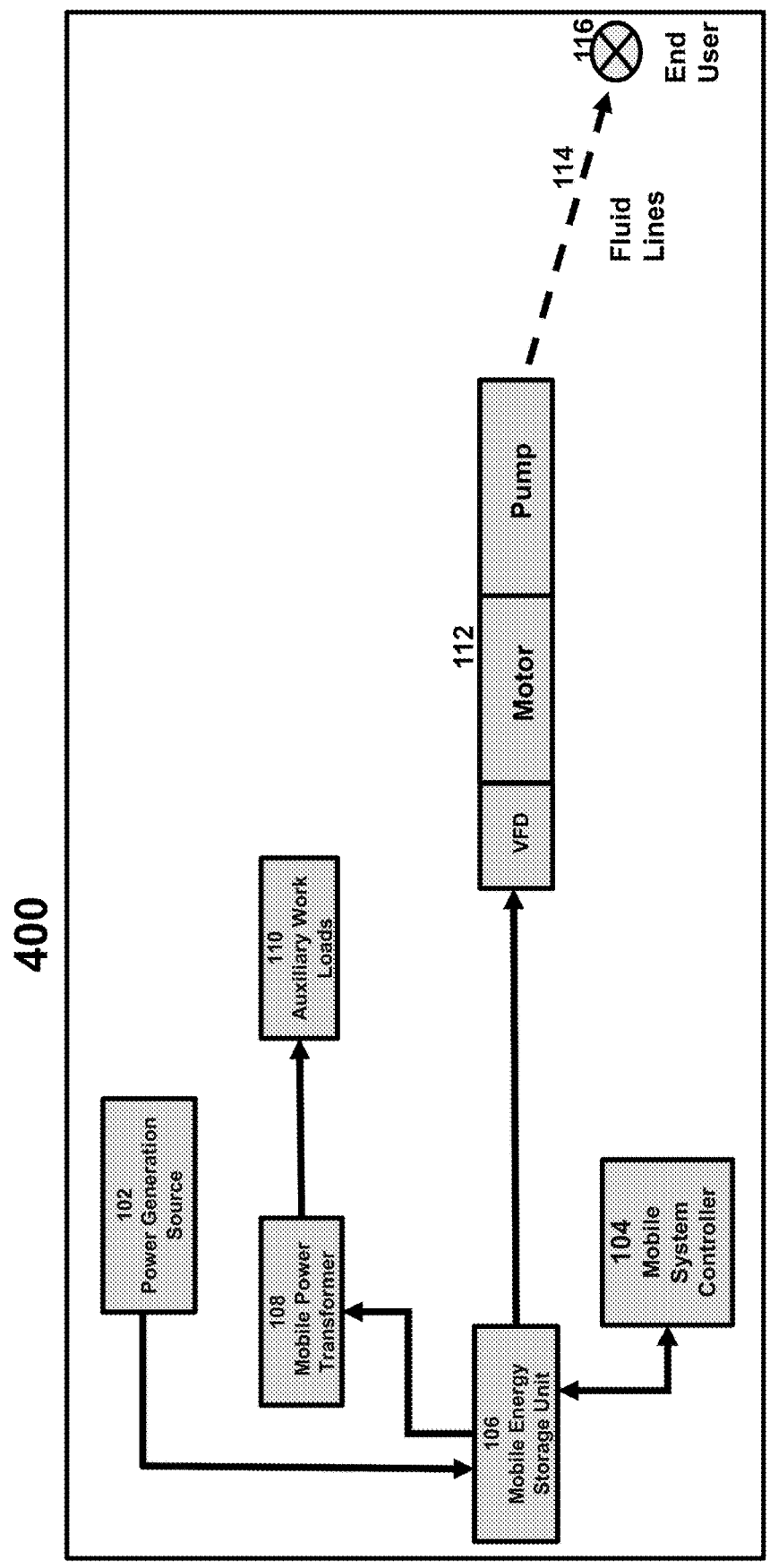
FIG. 4 is a schematic diagram of a single modular mobile work load system.

An example embodiment of the modular mobile energy system can include a primary work load system 100 (as shown in FIG. 1), a secondary work load system 200 (as shown in FIG. 2), and may also include additional modular work load systems 400 (as shown in FIG. 4). These systems can be configured into a combined work load system 300 (as shown in FIG. 3) to provide efficient energy to a particular application, e.g., a pressure pumping operation for an oil and gas application. These systems can also be further expanded in a number of similar ways to include variations in the configuration of equipment of each module that will be apparent as discussed below.

The primary work load system 100 includes a power generation source 102, a mobile system controller 104 (see also FIG. 7 described below), a mobile energy storage unit 106, a mobile power transformer 108, one or more mobile auxiliary loads 110, and one or more mobile pressure pumping loads 112. The power generation source 102 and mobile energy storage unit 106 are integrated together in this configuration to take advantage of peak shaving and load leveling, with the mobile system controller 104 enabling this integration. It can be appreciated that this also holds for systems 200, 300, and 400 described below. Each mobile pressure pumping load 112 includes a pump, motor, and a variable frequency drive (VFD) as illustrated in FIG. 1 The mobile auxiliary loads 110 and mobile pressure pumping loads 112 can operate with power provided by both the power generation source 102 and the mobile energy storage unit 106, or alternatively, the mobile energy storage unit 106 only.

The secondary work load system 200 shown in FIG. 2 includes a power generation source 102, a mobile system controller 104, a mobile energy storage unit 106, and one or more mobile pressure pumping loads 112. The mobile pressure pumping loads 112 can operate with power provided by both the power generation source 102 and the mobile energy storage unit 106, or alternatively, the mobile energy storage unit 106 only. Additional similar work load systems, such as that illustrated in the singular work load system 400 in FIG. 4, can be combined in parallel to increase the overall size of the systems. The singular work load system 400 in this example includes a power generation source 102, a mobile system controller 104, a mobile energy storage unit 106, a mobile power transformer 108, one or more auxiliary loads 110, and one or more pressure pumping loads 112. It can be appreciated that an advantage of the overall system design is the modularity and flexibility in combining various work load systems for a given applications, e.g., for a given oil and gas operation. This can allow for significant efficiency improvements in capital and operating costs and a reduction in environmental costs and increased safety in operations.

An example of a potential configuration is shown in the combined modular mobile work load system 300 shown in FIG. 3. In this system, a primary work load system 100 as was illustrated in FIG. 1 can be combined with a secondary work load system 200 as was illustrated in FIG. 2 to create a customized combined work load system 300. As shown in FIG. 3, by combining the two systems, a pair of mobile system controllers 104 are provided and can be linked as shown to enable communication and coordination between the modular systems. To link the controllers 104 into a control system one can connect the components of the system by means of control wires, ethernet communication, radio communication etc. as shown in the figures. The control system receives all information available from each component and based on program logic that is stored in a controller, takes an action according to the logic. The action can include a remote control of each system component or it can include providing information to the operator in form of an alarm or warning. The number of actions can be programmed to be intelligent where speed may be critical or may be governed in the way that operator takes an action based on information presented by control system, usually on the computer screen. The control system functions shown in FIG. 7 can be operated either independently or dependent on other functions, which can be specified in the control logic.

Also, the fluid lines 114 feeding the end user 116 are supplied by both systems 100, 200. The combined configuration shown in FIG. 3 is advantageous as it allows the system to downsize the turbine genset size because of the modular design allows this to be done in real time or because different job requirements do not need the larger turbine genset. For example, if a job requires a total output of two generators, yet a portion of the job only requires the capacity of one genset, the system can be configured to not run the second genset for that portion. This effectively reduces the size of the genset for that portion of the job. The genset can also be reduced in size by utilizing the energy storage unit 106 as taking up a portion of the power required to do the job.

The mobile power generation source 102 serves to provide a steady and consistent power supply along appropriately sized power cables to the energy storage unit 106 and to mobile pressure pumping loads 112 and mobile auxiliary loads 110 at a certain voltage and current that depends on the particular type of power generation source 102 utilized. The power generation source 102 can be one or a combination of reciprocating engine(s), rotating turbine engine(s) or other type of engine(s) or solar or wind power generation equipment. The power generation source 102 can be a stationary (i.e. fixed utility location connection) or mobile power source. To be provided in a mobile implementation, the power generation source 102 can be truck-mounted, trailer-mounted, container-mounted or skid-mounted for transport by truck, rail or helicopter or other suitable transportation means. Furthermore, one or more power generation sources can be combined to provide power to the mobile energy storage unit 106.

Figure 5:
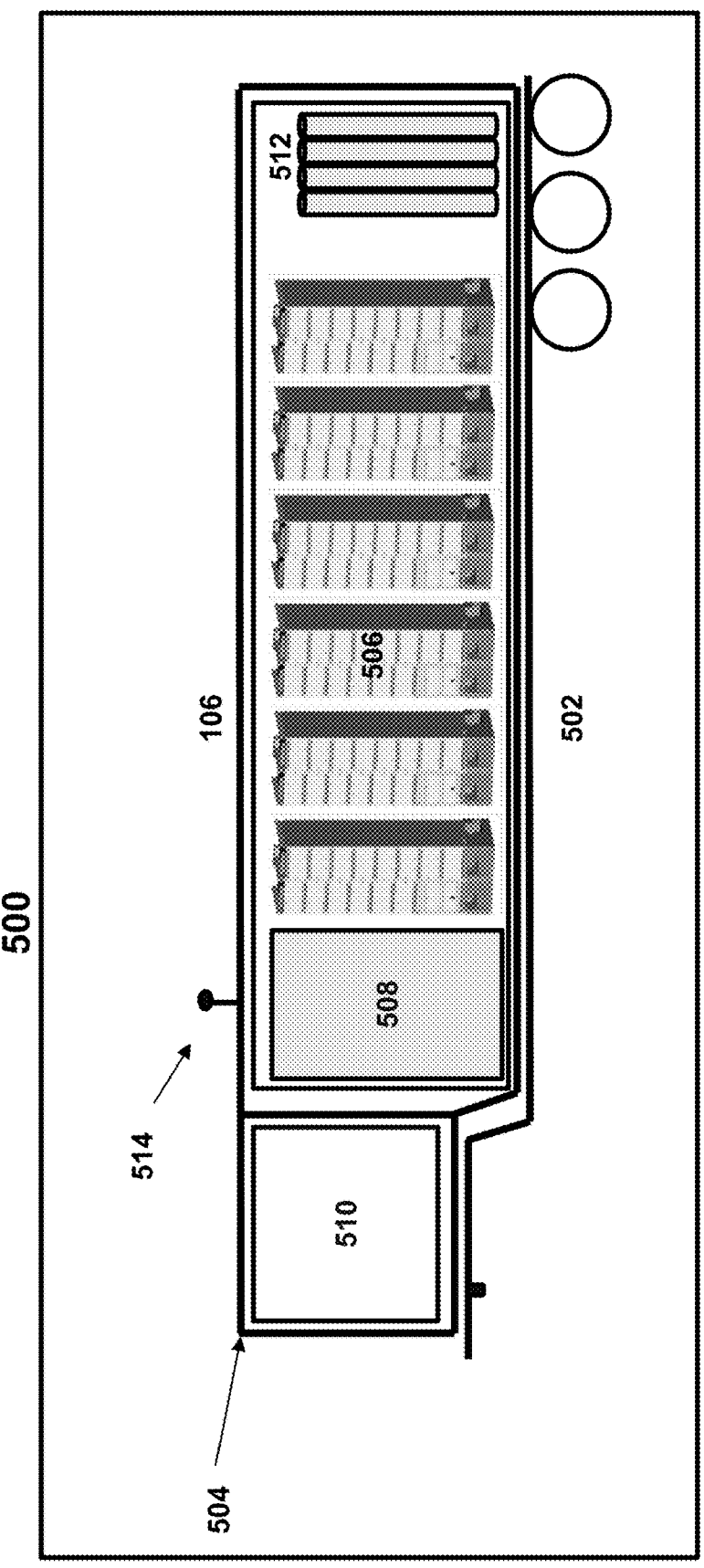
FIG. 5 illustrates one embodiment of a mobile energy storage unit configuration.

One embodiment of the mobile energy storage unit 106 is shown in FIG. 5. This figure includes only one example of a potential configuration, but should not be considered as limiting the different configurations, for example, by including additional or fewer trailer axles or additional or fewer battery racks 506, or different numbers of other energy storage devices, including but not limited to capacitors. The mobile energy storage unit 106 is electrically connected to the mobile system controller 104 via control cable connections. The mobile energy storage unit 106 can include one or more chemical batteries, one or more chemical batteries and one or more electrical capacitors, or other energy storage devices that can receive and store energy and then transmit this stored energy back to the mobile pressure pumping loads 112 and (if applicable) auxiliary loads 110.

The mobile energy storage unit 106 structure can contain substructures (e.g., specially cushioned racks) for various energy storage device types, including at least one of, but not limited to, the following battery racks 506 filled with lithium-ion (Li-ion), nickel cadmium (Ni—Cd), nickel-metal hydride (Ni-MH) and lead-acid batteries, capacitors and other energy storage devices. The mobile energy storage unit 106 can include any number or combination of energy storage device types. An important aspect to the configuration of the mobile energy storage unit 106 is to be capable of operating without the power generation source 102 to ensure a high degree of operational flexibility and redundancy.

For example, while setting up to complete a given operation, minimal power requirements can be satisfied with power delivered solely from the mobile energy storage unit 106 without the need for the power generation source 102 to be operating, thereby lowering overall costs (capital, operating and environmental). The system can also include inverters (not shown) as required to convert alternating current (AC) to direct current (DC), and vice versa, at appropriate electrical connections into and out of the mobile energy storage unit 106.

The mobile energy storage unit 106 can therefore be fully modularized and capable of being transported in a desired manner. To be mobile, the mobile energy storage unit 106 can be truck-mounted, trailer-mounted 502, container-mounted or skid-mounted for transport by truck, rail or helicopter or other suitable transportation means. The frequency of transportation can be at least once per day in some applications. To withstand such frequent transportation, the mobile energy storage unit 106 design can include a variety of protective measures to ensure the chemical batteries and/or electrical capacitors are not physically damaged. These protective measures can include but are not limited to springs, air shocks or other similar devices attached to the battery and/or electrical capacitor frames to reduce transportation related vibrations and movement. The mobile energy storage unit 106 components can also withstand larger potential transportation accident events such as a roll over, penetration from a foreign object or a large impact event (i.e. a crash) using a specially designed container 504.

The mobile energy storage unit 106 can be temperature controlled for high and low ambient temperature operation and can include appropriate supplementary heating and ventilation 510, fire suppression 512 and alarm systems as well as g-force indicators to monitor vibration at various points located on the mobile energy storage unit 106. All supplementary systems for the mobile energy storage unit 106 can be wirelessly connected 514 to a remote device for continuous monitoring and data capture. For example, these supplementary systems can be monitored by the transportation provider and can also be connected to the mobile system controller 104 for use during operations.

Figure 9:
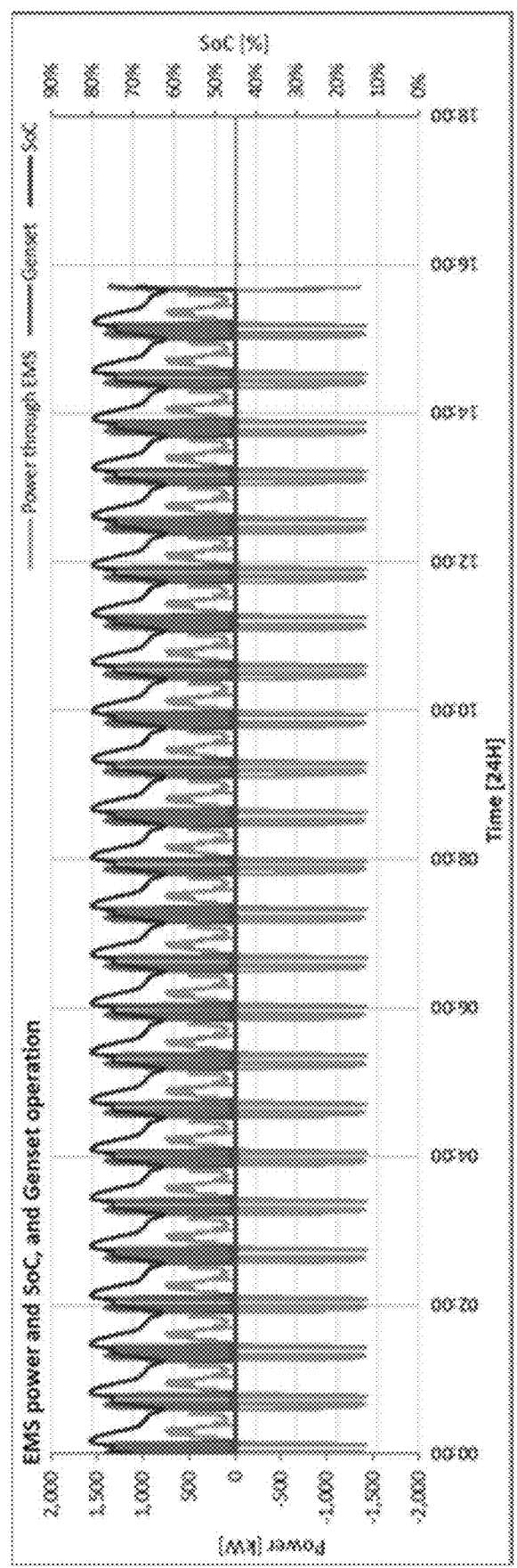
FIG. 9 is a chart showing an example EMS (energy management system) power and SoC, and Genset operation.

An important aspect of the mobile energy storage unit 106 is the use of an energy management system 508 that protects the mobile energy storage unit 106 from being overcharged and/or having too much power withdrawn which would affect the useful life of the unit and can also protect the system from thermal runaway. The energy management system 508 is typically included with each energy storage unit 106 and is shown for illustrative purposes in FIG. 5. The energy management system 508 keeps a certain state of charge in the batteries depending on what the user wants to retain for a state of charge. Such a system can, for example, include physical system switches to limit power drawn and a load bank to divert excess power from entering the energy storage unit 106. The energy management system 508 is connected to the mobile system controller 104 to facilitate charging and discharging capabilities at optimal times during operation. The energy management system 508 is considered to be a key part of the battery/capacitor subsystem and would be effectively attached to/included with any such system. A chart showing an example EMS (energy management system) power and SoC, and Genset operation is provided in FIG. 9.

Referring again to FIGS. 1, 3 and 4, the mobile system controller 104 may also be electrically connected to a mobile power transformer 108. The mobile power transformer 108 serves to transform the power transmitted from the mobile energy storage unit 106 to a different voltage. This voltage can be used by the mobile auxiliary loads 110 and can be less than, but may be greater than, that used by the mobile pressure pumping loads 112. The mobile auxiliary loads 110 can include, but are not limited to, the use of compressors, electric motors, fluid blending systems, air-conditioning and heating systems, control systems, data capture systems and lighting systems.

The mobile pressure pumping loads 112 can comprise a pump, motor and variable frequency drive system that can be controlled by the mobile system controller 104. The fluid output from the pump is connected by pipes, valves and manifolds 114 to an end user 116. Each fluid output shown in 100 and 200, for example, can be combined before entering the end user 116. The end user 116 can be an oil and gas well, pipeline connection or line pipe in a processing plant or other similar oil and gas end user. The pump, motor and variable frequency drive system can be truck-mounted, trailer-mounted, container-mounted or skid-mounted for transport by truck, rail or helicopter or other suitable transportation means.

Figure 6:
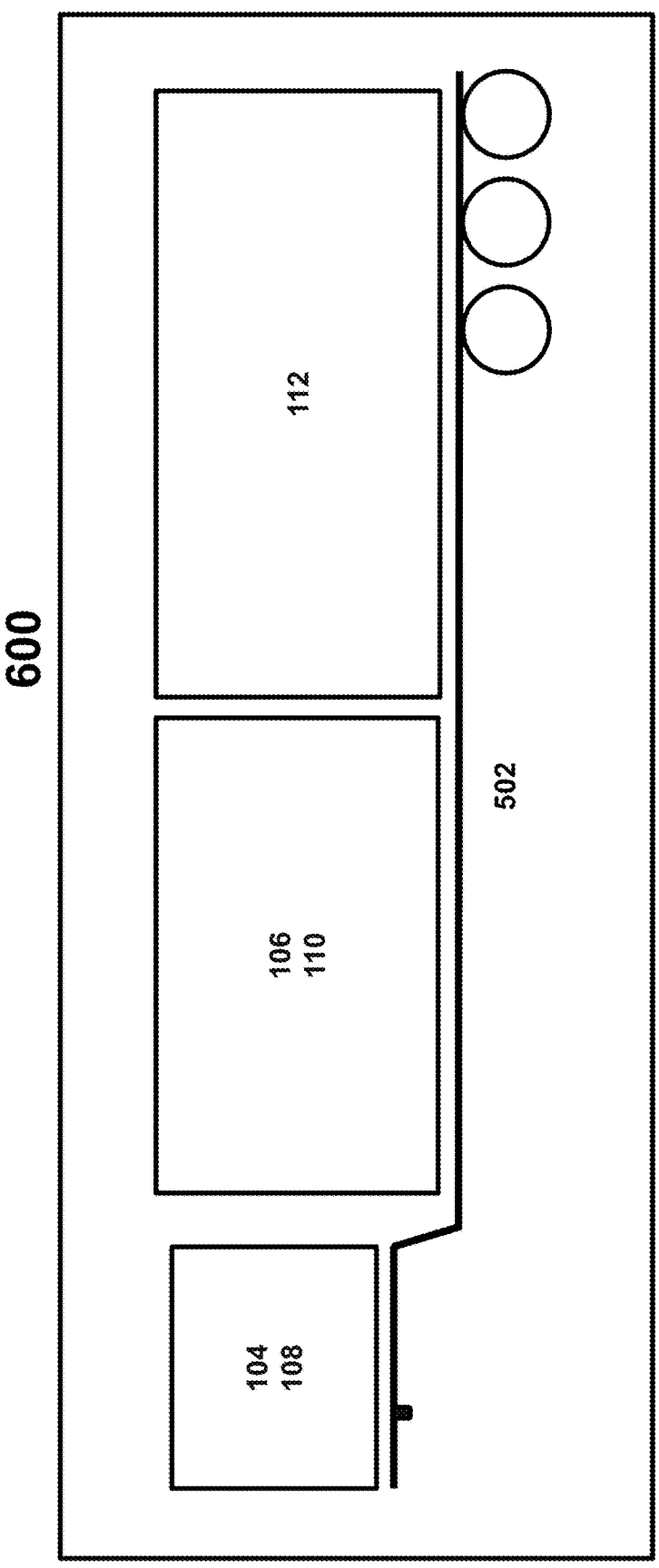
FIG. 6 illustrates one embodiment of a single modular mobile work load system configuration.

One embodiment of the single work load system 400 but without a power generation source 102 is shown in FIG. 6. This figure (as well as the other figures) includes only one example of a potential configuration, but should not be considered limiting. For example, by including additional or fewer trailer axels, additional or fewer mobile pressure pumping loads 112 or additional or fewer energy storage units 106 and additional or fewer auxiliary load 110 components or additional or fewer sub components for each of these systems. This configuration provides for a "self-contained" system and can be trailer-mounted 502, container-mounted or skid-mounted for transport by truck, rail or helicopter or other suitable transportation means. In the example shown in FIG. 6, the mobile system controller 104 and mobile power transformer 108 are housed together, the energy storage unit(s) 106 and mobile auxiliary load(s) 110 is/are housed together, and the mobile pressure pumping load(s) 112 is/are housed separately. The components shown in FIG. 6 can be combined in a variety of ways in terms of size, number and physical placement (i.e. order on the trailer shown) to complete different types of operations. This results in a fully modular system that can be scaled up or down and can result in more efficient, less costly and time-consuming operations.

Figure 7A:
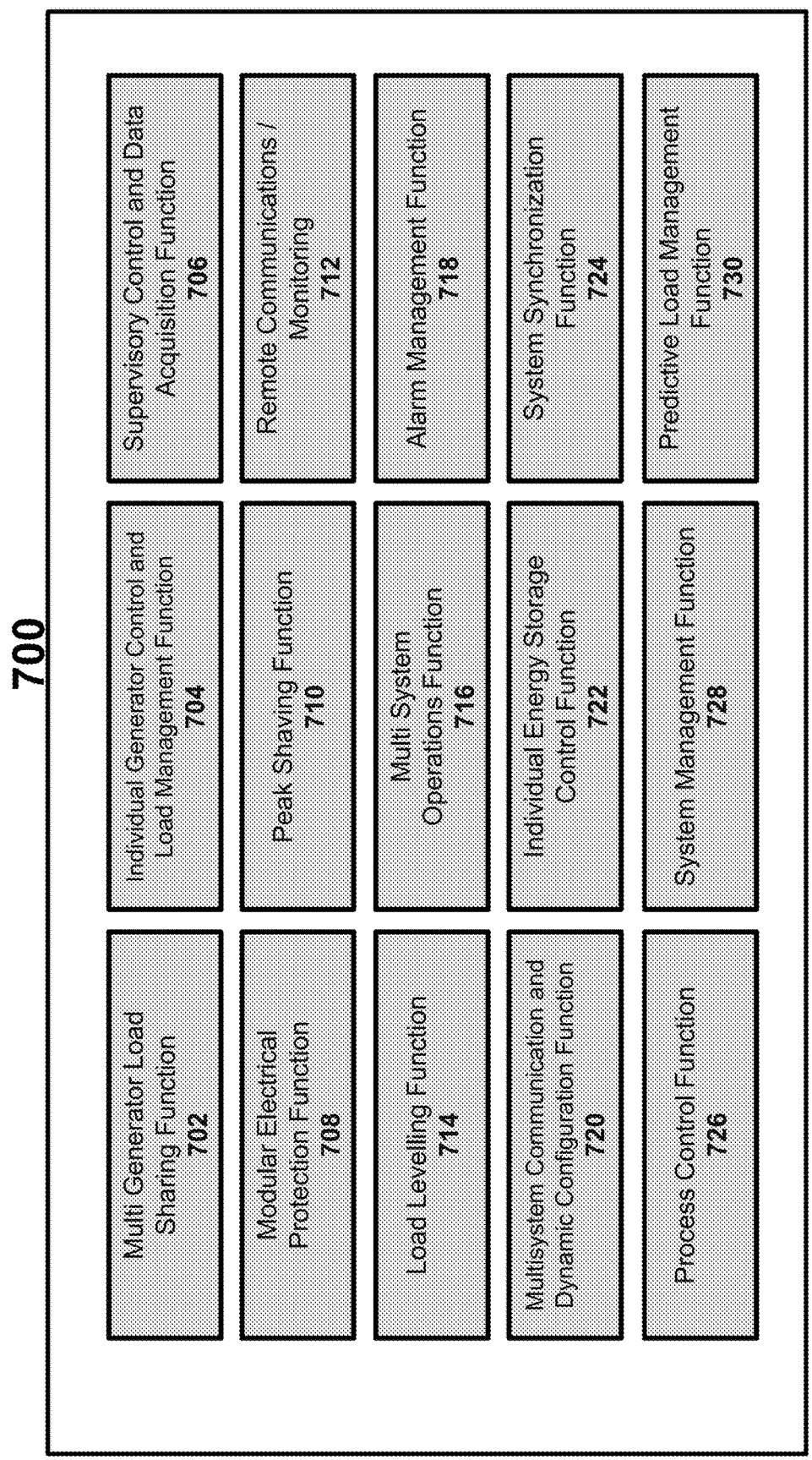
FIG. 7A. is a schematic component diagram of a mobile system controller.

The mobile system controller 104 provides overall control to the work load systems 100, 200, 300 and 400 as mentioned above. An example configuration illustrating components of the mobile system controller 104 is shown in FIG. 7A. Such components are shown for illustrative purposes only and should not be considered limiting, for example, additional components may be added to further augment the system. The components included are used to provide controls and protections, and to operate the overall work load systems 100, 200, 300, 400 in the most efficient manner.

The multi-generator load sharing function 702 assigns the distribution of load amongst available power generation sources, including any utility supply, if available. The individual generator control and load management function 704 provides control and monitoring of a single power generation source and its associated ancillary equipment. The supervisory control and data acquisition function 706 provides local and remote monitoring of the overall system. The modular electrical protection function 708 is an electrical protection scheme which supports multiple configurations of generation, transmission, and energy storage assets, as well as loads. The peak shaving function 710 dispatches available energy storage unit power to respond to demand which exceeds the capacity of any power generation source in the system. Remote communications/monitoring 712 provides fleet monitoring/management, data historization, analytics, and allows dispatch via wireless/wired/hardwired network connection(s).

The load levelling function 714 uses energy storage to support the most efficient operation of available energy sources. It assesses power source efficiency, energy storage state of charge, and charge/discharge rates. Multi system operations 716 provides apportionment of real and reactive load to each power generation source synchronized. The alarm management function 718 provides both main system/ subsystem alarm management. The alarm management system configuration is modular to support addition/removal of system elements. The multi-system communication and dynamic configuration function 720 is a modular communication scheme for use in communicating between SCADA, the controller, and individual control elements. The individual energy storage control function 722 provides energy storage control for each energy storage asset. This function monitors and controls charging of the energy storage system, state of charge, temperature, system status, and metering. The system synchronization function 724 allows multiple alternating current power sources to be connected safely and to work together as an electrical system by synchronization of output voltage and frequency.

The process control function 726 provides the common control of the user's connected process, powered by the system described herein, including control of motors/pumps and variable-frequency drives, to provide the user's desired process conditions. The system management function 728 uses an algorithm to determine optimal loading/charging arrangement based on asset efficiency, asset availability/capacity, energy storage state of charge, and system demand. This function monitors status of assets within system, determines available capacity/demand, dispatches energy sources, uses a loading algorithm to control loading of available generator assets and a charging algorithm to control charging of the energy storage system. The predictive load management function 730 considers pump efficiency, load protection, preventative maintenance requirements, and input from online data analysis to predict what the near-term load requirements will be. To maintain drawing clarity, the various electrical and control connections between the components has not been illustrated, but many components are connected to more than one other component in the mobile system controller 104. The mobile system controller 104 can allow for complex multi-variable feedback loops to minimize system energy losses, minimize operating costs and increase safety through reduced human intervention.

Figure 7B:
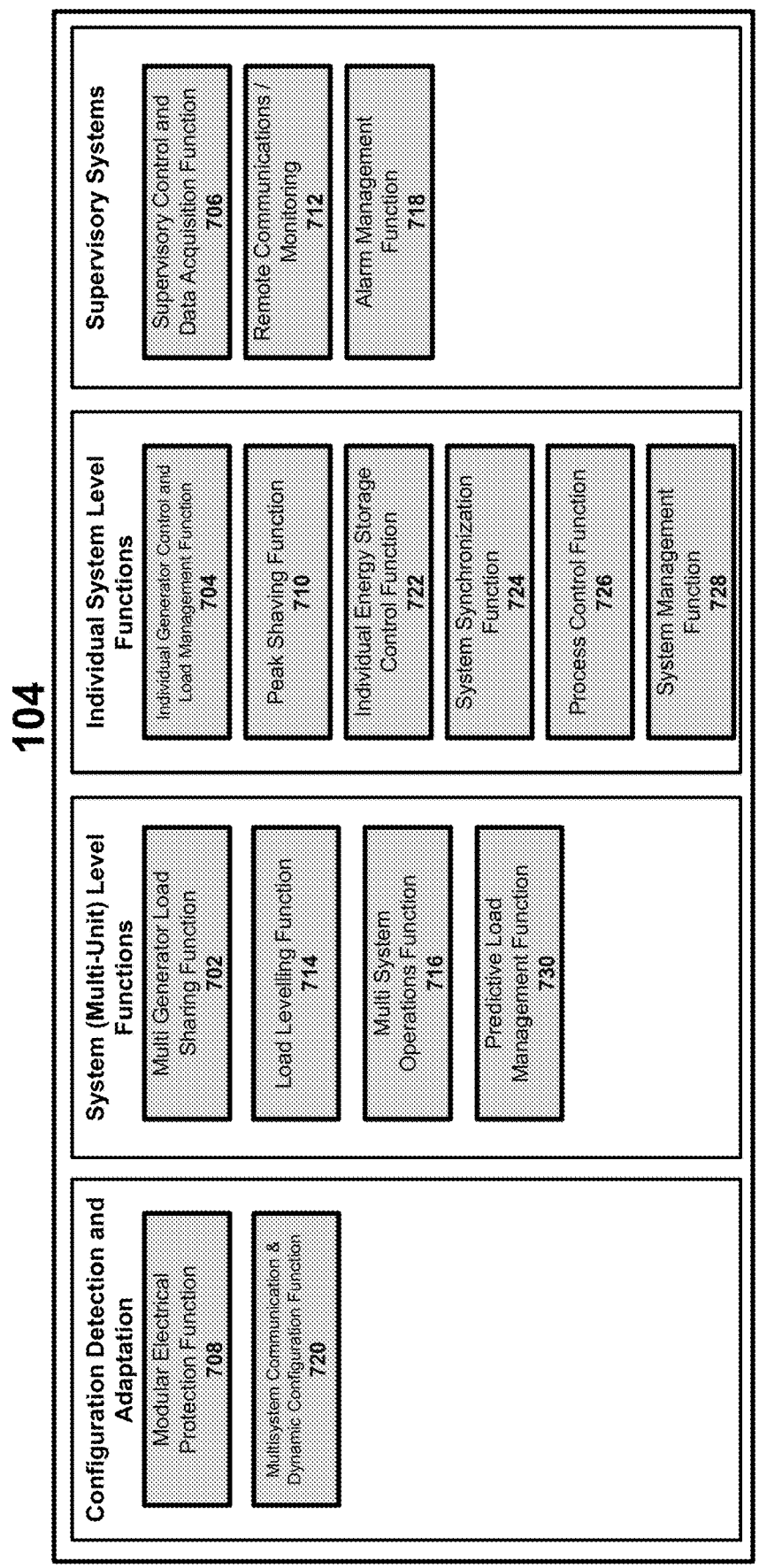
FIG. 7B is a schematic diagram illustrating interacting functions of those shown in the diagram of FIG. 7A.

The modular electrical protection function 708, the multi-system communication and dynamic configuration function 720 and the predictive load management function 730 are particularly advantageous to the overall system performance and safety and are software configurable. The predictive load management function 730 includes engineered protection settings for various scenarios based on the configurations possible, and can have such settings built as configurations to load into the software-programmable electrical protection/metering equipment. Operationally, this function includes: detection of connected equipment, selection of a matching preconfigured scenario, loading the protection settings to the programmable protection/metering equipment, and reading the configurations back to confirm they are as expected. That is, this function checks to ensure what is to be connected is part of the program and aligns to the protocol. FIG. 7B illustrates example groupings of the functions from FIG. 7A. For example, the modular electrical protection function 708 and multi-system communication and dynamic configuration function 720 can be utilized for configuration detection and adaptation. Also, the multi generator load sharing function 702, load leveling function 714, multi-system operations function 716, and predictive load management function 730 can be used to provide system (multi-unit) level functions. The individual generator control and load management function 704, peak shaving function 710, individual energy storage control function 722, system synchronization function 724, process control function 726, and system management function 728, can be used to execute individual system level functions by the system controller 104. Similarly, the supervisory control and data acquisition function 706, remote communications/monitoring 712 and alarm management function 718 can be grouped as a set of supervisory systems. It can be appreciated that, as shown by way of example in FIG. 7B, the modular functions shown in FIG. 7A can enable the system 100, 200, 300, 400 to selectively provide any desired functionality to suit the particular application(s), such as shown illustrated in FIGS. 1-4 and 8.

Figure 10:
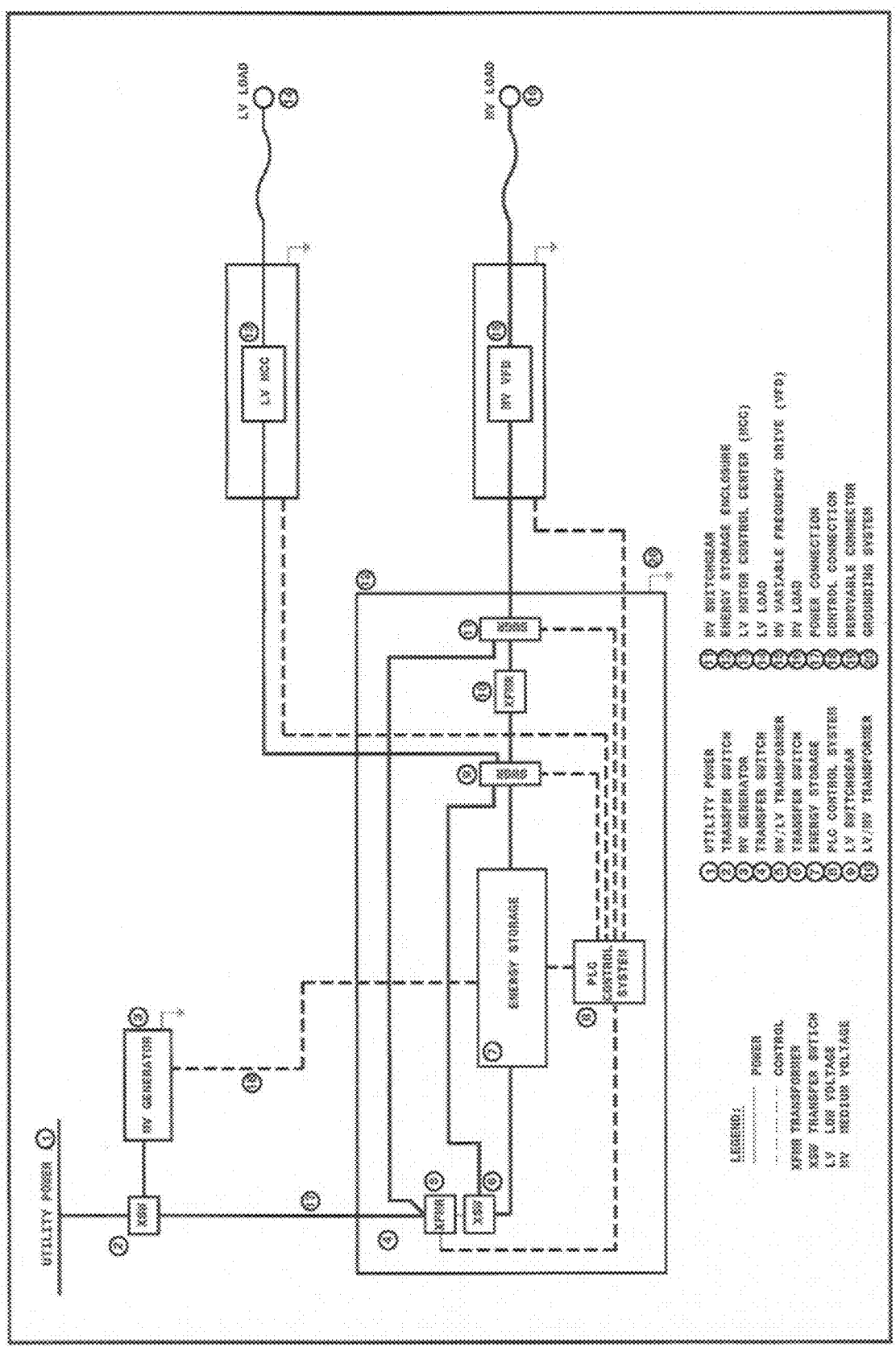
FIG. 10 is a communication schematic showing communications from the loads back to a programmable logic controller (PLC) control system.

FIG. 10 illustrates a communication schematic showing communications from the loads back to the PLC control system. These systems work to limit over/under current, leakage current, protection relays, under voltage protection relays and load flow relays and communicate between individual system components (i.e. power generation sources, energy storage and loads) as well as between the modular work load systems. These systems can accommodate different user specified configurations of power generation sources/sizes, energy storage types/sizes and types/sizes of loads for different oil and gas operations. This differs significantly from typical stationary power applications, where the number of power generation sources and possible loads is fixed, resulting in consistent and constant system parameters.

It can be appreciated that being mobile and modular (unlike typical plant or manufacturing applications), the presently described mobile system 100, 200, 300, 400 requires that various different loads or assets are meeting up at different times on a job location and will need to be recognized by the mobile system controller 104 so that when the load is plugged into the system 100, 200, 300, 400, it is recognized where all the parameters on the safe efficient operation of the load are already known. Depending on what the program is calling for the job might require the load to run at, for example, 80 percent of capacity where on the next job it might be required to run at 50 percent, as an example. Another example might be that the load has a certain limit of g-forces that can be applied and over that amount then the load output would be reduced until the g-forces are within acceptable limits. Another example would be that certain turbine gensets run better at 83 percent of output for optimum fuel savings and performance curves when another manufactured product can only run at 75 percent.

It can be appreciated that using batteries as the mobile energy storage unit 106 can raise the risk profile of the system, with thermal runaway being an example. As such, keeping the system safe in the rapid charge/de-charge of the energy storage unit 106 is considered in the configuration shown in FIG. 7 and in the overall design, particularly functions 706, 708, 712, 716, 718, 722, 724. The design also allows the system to control and synchronize all of the systems to improve efficiencies of the overall operation, for example with peak shaving/load leveling being an important consideration.

Figure 8:
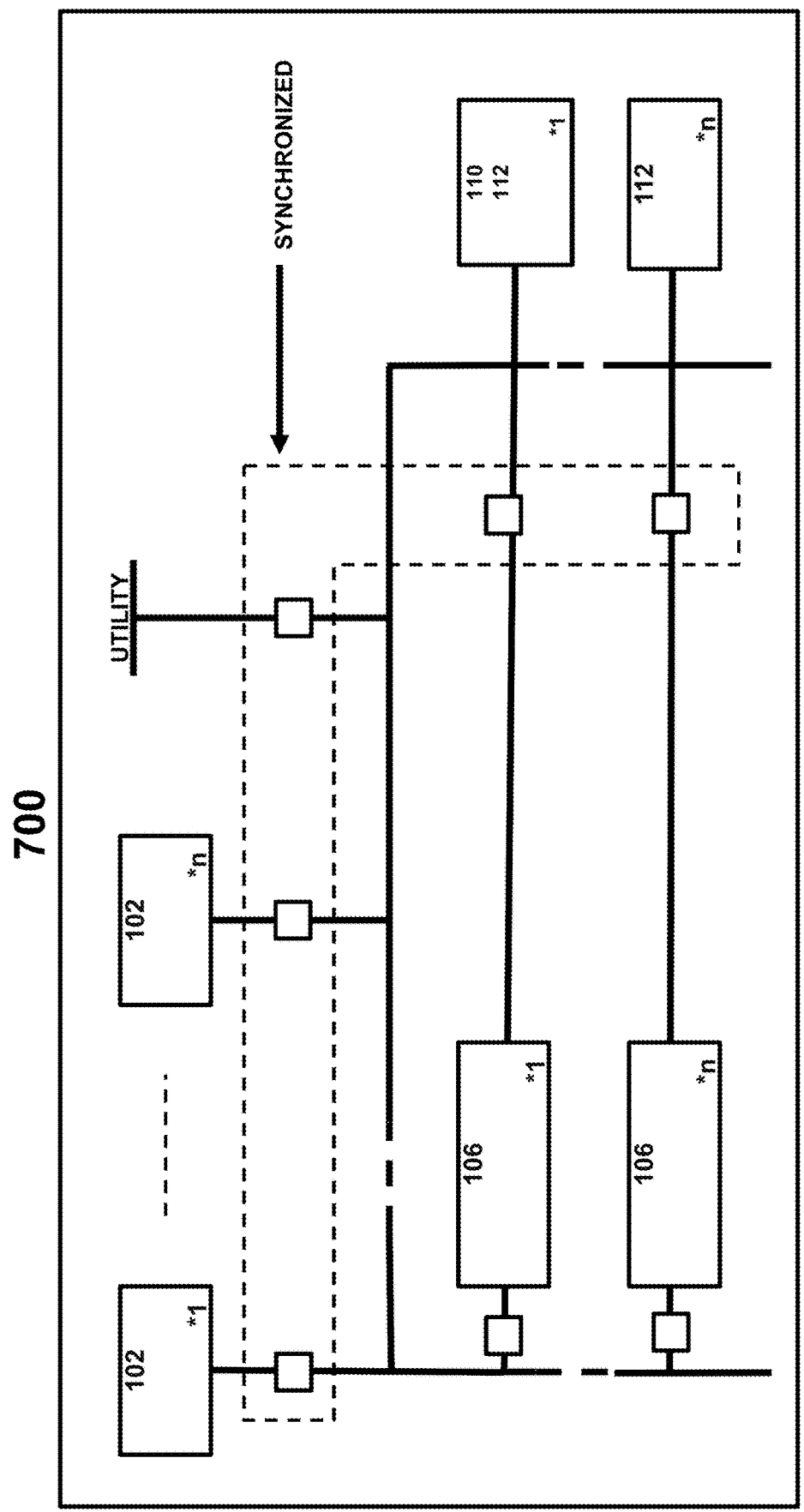
FIG. 8 is a schematic diagram of electrical connections and synchronization controls for a combined modular mobile work load system.

FIG. 8 shows a simplified electrical connection diagram of a combined work load system with some, but not all, potential interconnections between the different system components as well as the synchronization control required for the system. Various assets within the system such as gensets, VFD, transformers, etc., have built-in synchronization logic within its operational platform that is communicated to the mobile system controller 104. This synchronization control can include the mobile system controller 104 monitoring the synchronization of the entire system and taking necessary actions as required based on program logic, on a continual basis.

Furthermore, the modular work load systems shown in 100, 200, 300, 400, 500, 600 and 700 can be monitored on-site or remotely and managed through a variety of electronic digital output means, enabled by physical wired connections or wireless data services from the oil and gas operation site.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the systems 100, 200, 300, 400, 700, any component of or related thereto, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A power management system comprising:
   a plurality of power sources each having an efficiency and a power generation capacity associated therewith;
   one or more mobile energy storage units each having a state of charge and configured to receive power from the plurality of power sources, store energy and transmit power back to at least one of a plurality mobile equipment loads;
   each of the plurality of mobile equipment loads having a load demand;
   a mobile system controller configured to exchange data signals to/from the plurality of power sources, the one or more mobile energy storage units, and the at least one of a plurality of mobile equipment loads;
   wherein at least one of the plurality of power sources comprises a first category of power sources comprising one or more of: reciprocating engines, rotating turbine generators, utility power, or a combination thereof;
   wherein at least one of the plurality of power sources comprises a second category of power sources comprising one or more of: solar, wind, battery, or a combination thereof;
   wherein the mobile system controller uses the efficiency of the plurality of power sources, the power generation capacity of the plurality of power sources, state of charge of the mobile energy storage units and the load demands of the at least one of a plurality of mobile equipment loads to determine an optimal operational efficiency of the system; and
   based on the determined optimal operational efficiency of the system and the load demands of the at least one of a plurality of mobile equipment loads, selects the power source or sources with the power generation capacity most appropriate for the load demands, and selectively controls a percentage of output of each of the first and second category of power sources and the one or more mobile energy storage units;
   wherein the mobile system controller is configured to apply predictive analytics and algorithms to optimally distribute power throughout the system and for determining optimal power transfer to the pressure pumping and auxiliary loads; said predictive analytics including consideration of pump efficiency, load protection, preventative maintenance requirements, and input from online data analysis to predict what the near-term load requirements will be.

2. The system of claim 1, wherein the power management system protects the one or more mobile energy storage units from being overcharged or having too much power withdrawn, and from thermal runaway.

3. The system of claim 1, wherein the equipment comprises pressure pumping equipment.

4. The system of claim 1, wherein the mobile system controller is configured to control the flow of power to and from the mobile energy storage units and to the at least one of a plurality of mobile equipment loads.

5. The system of claim 1, wherein the mobile system controller is further configured to control the flow of power to and from an auxiliary load.

6. The system of claim 5, further comprising a mobile power transformer interposed between the mobile energy storage unit and the auxiliary load.

7. The system of claim 1, wherein the operation comprises transmitting fluid to an end user via a pipe, manifold and/or other connection.

8. The system of claim 1, wherein the components of the system are modular and can be added, removed and/or rearranged to increase or decrease the size of the system.

9. The system of claim 1, wherein the mobile energy storage units, the mobile system controller, and the at least one of a plurality of mobile equipment loads are mounted on a container, skid, trailer or other mobile structure to enable transportation via a mode of transportation.

10. The system of claim 1, wherein the system is configured to enable power to be provided to the at least one of a plurality of mobile equipment loads without using the plurality of power sources.

11. The system of claim 1, wherein the system is configured to enable power to be provided to the at least one of a plurality of mobile equipment loads using only the one or more mobile energy storage units.

12. The system of claim 11, wherein the one or more mobile energy storage units are used as the only source of power for an amount of time depending on a user requirement and/or storage unit size.

13. The system of claim 1, wherein the mobile energy storage unit contains at least one battery and associated temperature control, safety and alarm system and wireless data transmission components to provide power to the mobile system controller.

14. The system of claim 1, wherein the mobile system controller is comprised of multiple electrical control system functions combined to operate, record data, synchronize, coordinate, protect and control the entire electrical system and associated at least one of a plurality of mobile equipment loads.

15. The system of claim 1, wherein the mobile system controller is configured to combine multiple work load systems together in a modular and expandable fashion.

16. The system of claim 1, wherein the mobile system controller is configured to combine different numbers and types of power sources, energy storage units and loads for a given work load system.

* * * * *